Patented Apr. 29, 1941

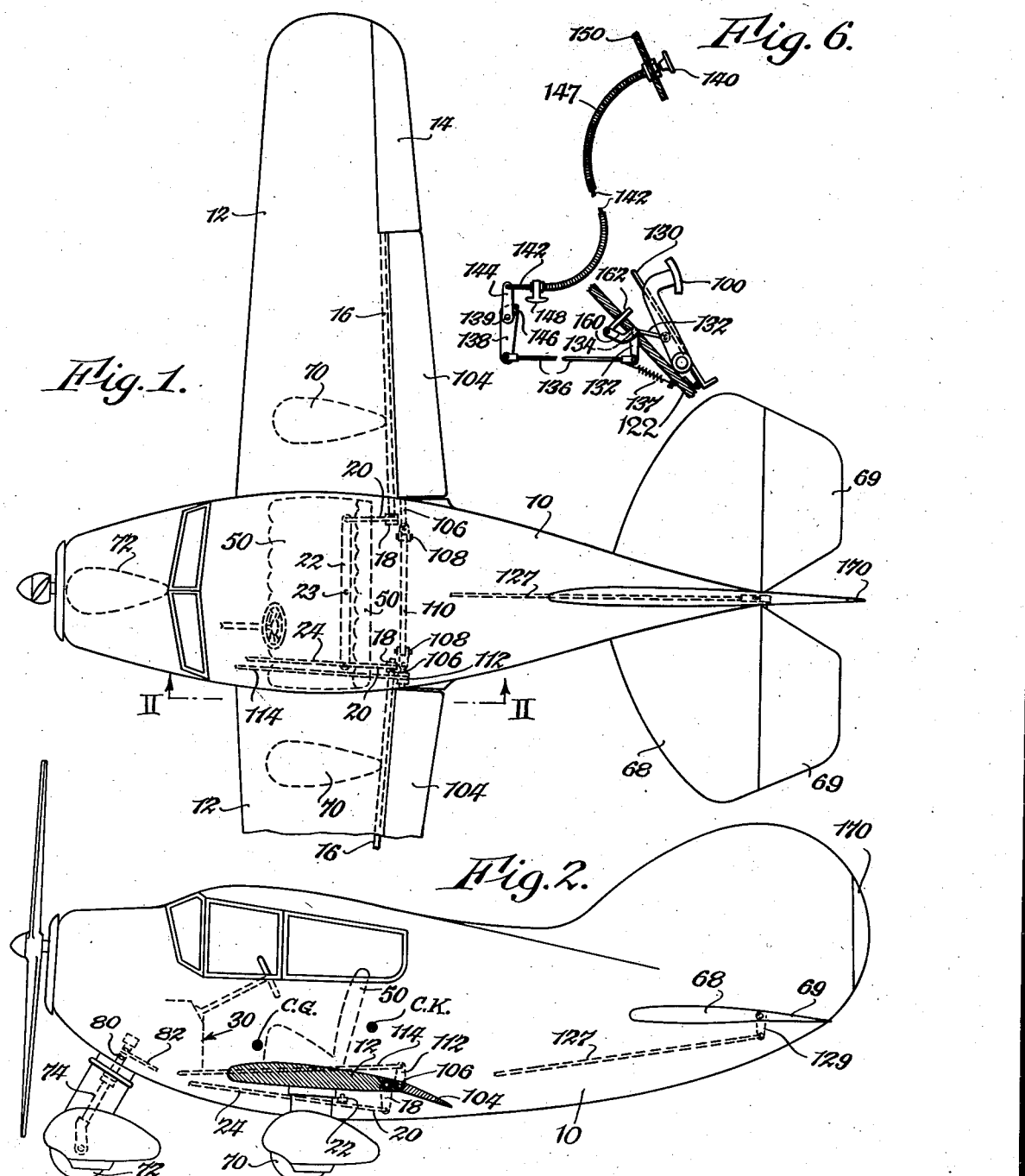

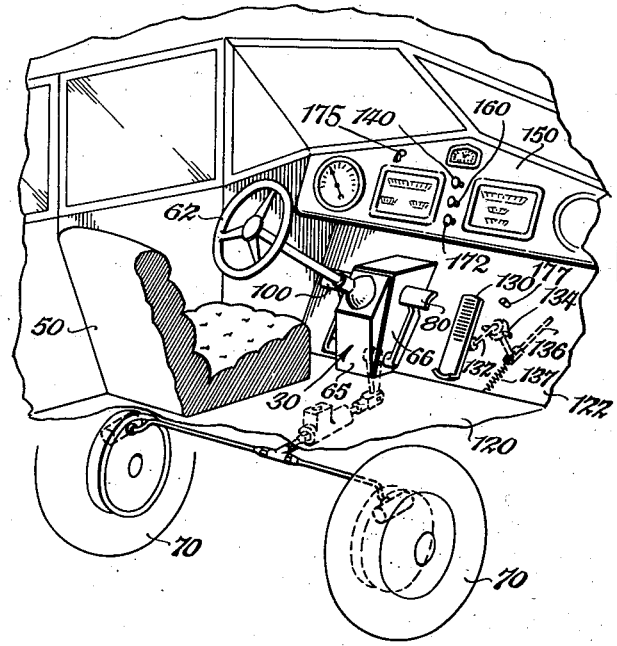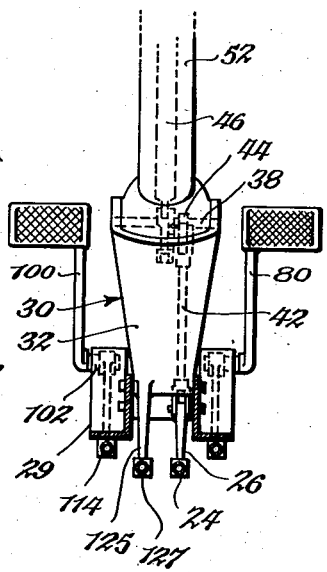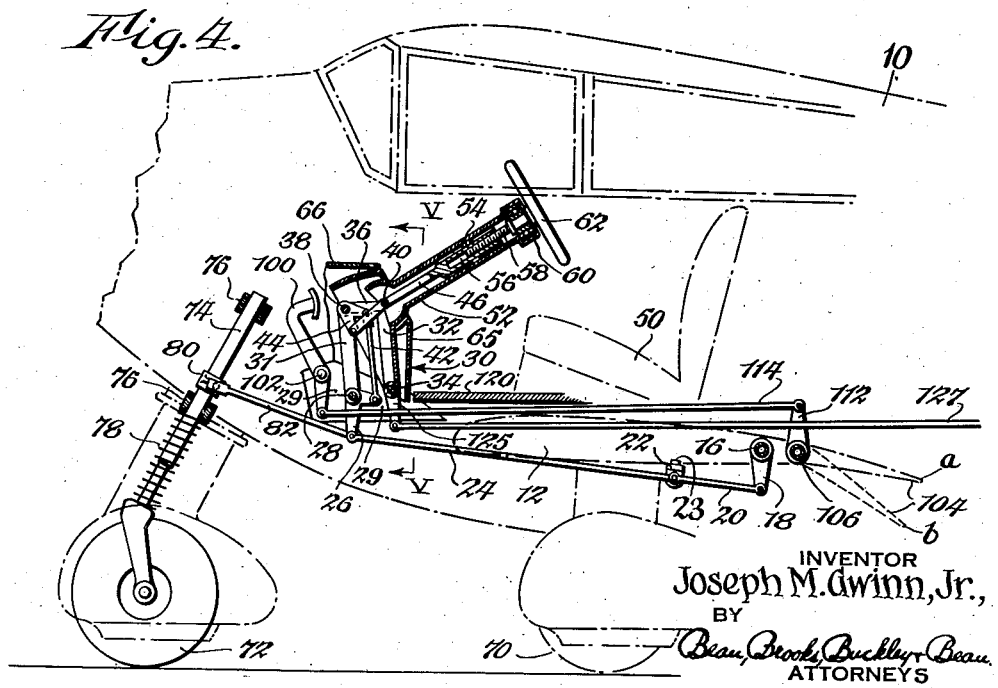

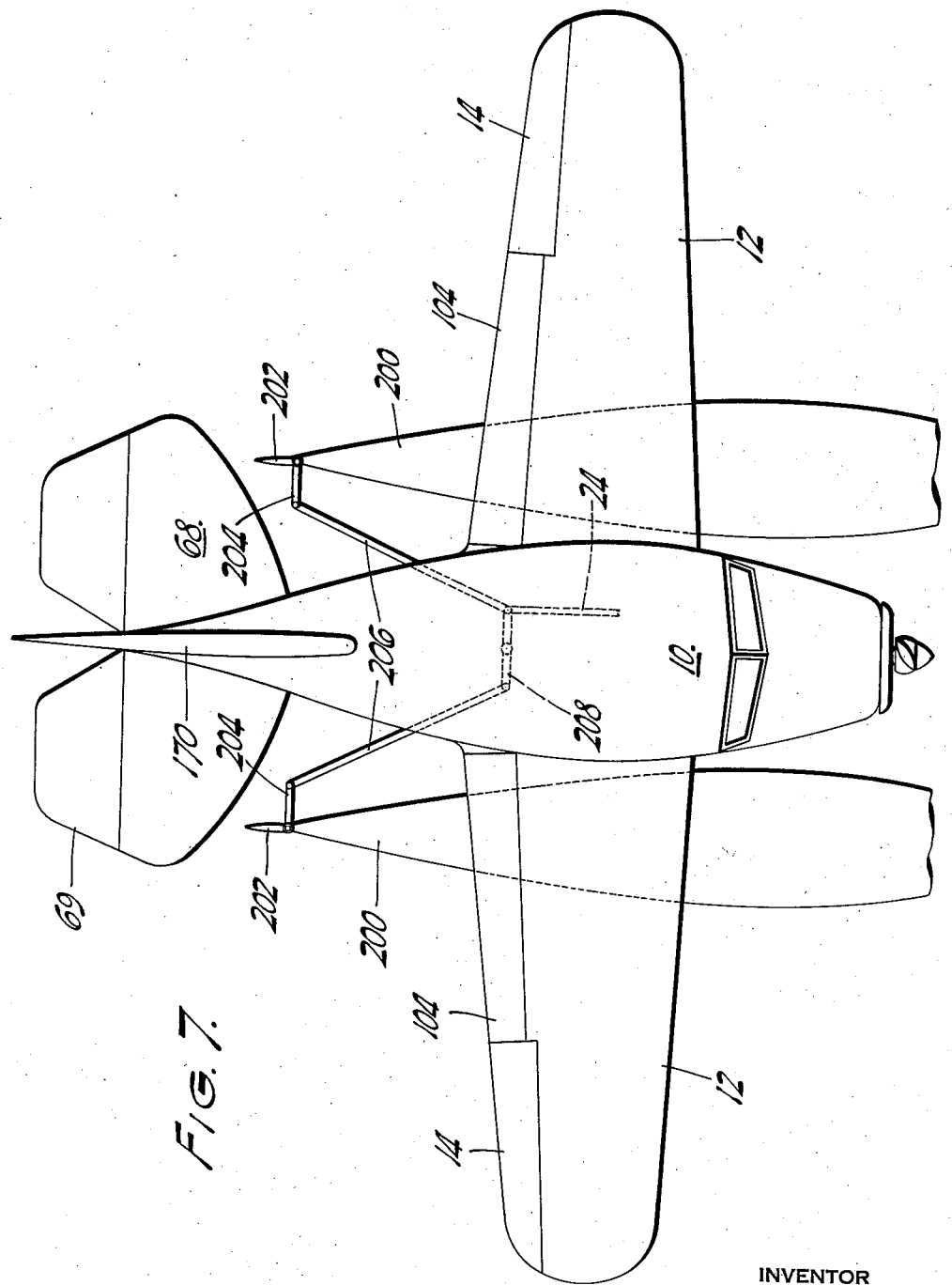

2,240,259

UNITED STATES PATENT OFFICE 2,240,259

AIRCRAFT

Joseph M. Gwinn, Jr., Buffalo, N. Y.

Application February 3, 1938, Serial No. 188,532

15 Claims. (Cl. 244—83)

This invention relates to aircraft, and more particularly to airplane control means.

Owing to the widespread character of present day use of the automobile most persons have become familiar with certain standard arrangements of operator-control elements and the attendant technique for controlling such vehicles to the extent that he effects the control of such vehicles, to at least some degree, in a subconscious manner.

The generally standard type of automobile control arrangement includes a steering wheel operable for directional control purposes by rotating it toward the direction of the desired turn, and a primary speed control means comprising a group of pedals extending from the floor of the passenger compartment adjacent the steering wheel column for controlling the rate of automobile travel. A pedal to the left of the steering column is operably connected with the engine clutch engaging and disengaging means and thus controls the transmission of power to the driving wheels of the automobile. The left pedal, therefore, constitutes the major speed control means of the vehicle. A pedal to the right of the column is connected to the wheel brake actuating means, and a second pedal adjacent the brake pedal is provided for controlling the rate of engine revolution by adjusting the engine throttle setting. The engine throttle control pedal is arranged in such manner that application of pressure thereon against the action of a spring opens the throttle to increasingly higher speed positions. When the throttle control pedal is released it automatically returns to its Off or engine idling position in response to the action of the spring. A fixable throttle setting means in the form of a push-pull rod or wire terminating in a button or knob located on the instrument panel within reach of the operator's hand is usually provided whereby the operator of the automobile may actuate the engine throttle to different positions of adjustment, the button being adapted to be pulled toward the operator to successively higher engine speed positions. Upon release of the control button or knob the throttle remains in its latest adjusted position due to friction-resistance to relative motion between the mechanism and its supporting structure. Thus, the operator may set the throttle at any desired position for uniform engine revolution performance. The pedal throttle-control mechanism is coupled to the fixable throttle control mechanism in such manner that the fixable throttle setting constitutes a variable datum for the pedal control means from any position of which depression of the pedal procures an increase in engine speed and to which the pedal throttle control means returns when released. An electric engine starter control button is usually provided protruding from the floor or from the instrument panel, and a carburetor choke button for facilitating the engine starting operation is usually provided on the instrument panel. Thus, when it is desired to put the automobile in motion the engine is started and the left pedal is successively depressed and released in such manner as to procure the desired engine-to-travel relationship, and the throttle control pedal is simultaneously depressed to procure the desired engine speed. To halt the travel of the automobile, the left foot pedal is depressed toward "stop" position, and the right foot is shifted from the throttle control pedal to the brake pedal for depressing the latter to actuate the wheel braking means. Throughout the complete operating cycle the automobile naturally remains at a level-to-the-ground attitude.

Previous types of airplane control systems have embodied principles of operation that require control techniques that are entirely different from automobile control technique for procuring corresponding maneuvers. For instance, directional control of airplanes has usually been effected through the medium of a centrally pivoted foot bar which is operably connected to an air rudder and adapted to be moved in response to pressures applied upon its opposite ends through the feet of the pilot. In conjunction with the manipulation of this rudder bar, the airplane is independently laterally banked by rocking a joy stick sidewise or rotating an aileron control wheel. The movements of the rudder bar and the aileron control means must be accurately coordinated to procure the desired directional maneuver and to avoid placing the airplane in a dangerous attitude. Speed control of the airplane has previously been procured by means of a combination of elevator manipulation and engine speed adjustment as effected by means of a joy stick and a throttle control lever, respectively. The engine throttle control lever is usually so arranged as to be pushed forwardly away from the pilot toward increasingly higher speed positions. For ground travel braking, ground wheel brake actuating means in the form of pedals are usually mounted as accessories to the rudder bar. Ground steering is usually accomplished through use of the air rudder without operating the banking control means, or by differentially actuating the ground wheel brakes, or by combining the action of both. Taking off and landing operations are accomplished by manipulating the elevator or longitudinal pitch control means to change the angle of attack of the wing, and are consequently accompanied by nosing up or nosing down maneuvers deviating from the level-to-the-ground attitude of cruising travel, and requiring accurate sense of depth perception during landing maneuvers on the part of the pilot.

Naturally, the principles governing the manipulation of the steering and speed control means of an automobile or any often-used vehicle become in time habit-ingrained in the subconsciousness of the operator of the vehicle with the result that, at least to some degree, the operation of the vehicle becomes largely a matter of subconscious reactions to changing situations. Because of the fact that control arrangements of present day automobiles and previous types of airplanes have involved so distinctly different principles of operation and kinds of pilot control movements for corresponding maneuvers, the average person has had no pre-training ready aptitude for airplane piloting. Therefore, the prospective airplane pilot has heretofore been obliged to first learn and subsequently practice a flight control technique that is based upon principles that are distinctly different from control technique principles of automobile steering and speed control which have previously become a part of his subconscious make up.

For the same reason, the automobilist who also pilots an airplane of the previous type has been obliged to rely either upon solely conscious direction of the controls of his airplane and his automobile, or upon continued practice to preserve two distinctly different sets of instinctive reaction characteristics. Therefore, any operator not engaging in continued practice has heretofore been deprived to a large extent of the benefits of "second sense" or subconscious control movement reactions to suddenly changing situations. Subconscious control movements are much faster than consciously directed control movements; and, if proper in nature, they contribute greatly to the safety and ease of operation of the vehicle. Therefore, the provision of an effective and simplified airplane control system that functions to procure corresponding maneuvers in response to a control technique system that is analogous to that employed in connection with the control of the standard automobile will greatly enhance the safety and ease of airplane travel; and will thus contribute to the further advance of the airplane industry.

One of the primary objects of this invention is to provide an airplane control system including improved and novel control arrangements for governing flight, taxiing, taking-off, and landing maneuvers, and involving simplified and improved operating control techniques.

Another object of the invention is to provide a control system for airplanes including pilot operable means closely simulating standard automobile control means both in relative arrangement and location of parts and in functioning effects, whereby the operator of the airplane may substantially apply previously learned automobile operating technique to the operation of the airplane in connection with both flight and earth surface travel operations.

Another object of the invention is to provide an airplane control system including a directional control means arranged to be manually operated by the pilot and a longitudinal control means arranged to be operated by the pilot's foot; the elements of the control system being so arranged that pilot operation of either of said control means may be accomplished without changing the disposition of the pilot's body relative to other of said control means.

These, and other objects and advantages of the invention will become apparent from the claims and the following specification which is a description of one exemplification thereof.

In the drawings:

Fig. 1 is a fragmentary plan of an airplane incorporating the principles of the invention;

Fig. 2 is a section taken substantially along line II—II of Fig. 1 and showing portions of the airplane in side elevation;

Fig. 3 is a fragmentary perspective of the interior of the pilot compartment of the airplane;

Fig. 4 is a fragmentary view in side elevation, on an enlarged scale, of portions of the control mechanism;

Fig. 5 is a fragmentary end elevation of a portion of the control mechanism, taken substantially along line V—V of Fig. 4; and Fig. 6 is a fragmentary view, on a larger scale, of portions of the engine throttle and wing lift control mechanisms.

Fig. 7 is a fragmentary plan of an airplane of the water-borne type embodying control means of the invention.

In the figures, an airplane is illustrated comprising a fuselage 10 and oppositely extending wing panels 12. Pilot-controllable banking or rolling moment procuring means are provided; and as illustrated herein, may comprise oppositely movable ailerons 14 pivotally mounted upon the tip ends of the wing panels 12 as by hinging them to the trailing edge portions thereof. The ailerons 14 are operably connected for coincidental pivotal movements in opposite directions about the axes of their hinged connections by means of torque tubes 16 extending toward the fuselage and provided at their respective inner ends with crank arms 18 which are in turn operably associated through means of links 20 with opposite ends of a cross bar 22. The cross bar 22 is centrally pivoted, as at 23, upon a stationary portion of the fuselage. (Figs. 1 and 4). A push-pull tube 24 is pivotally connected at one end to the cross bar 22 and at its other end to a bell crank 26 which is pivotally mounted, as at 28, upon a control mechanism base 29, which in turn is rigidly supported upon a portion of the fuselage 10 (Figs. 4 and 5). A pivotable control frame 20 comprising a pair of upright link members 31 and 32 is pivotally connected to the base 29 at spaced points of connection 28 and 34. The links 31 and 32 extend in substantially parallel upright relation, and at their upper ends are pivotally connected by means of a cross link 36, as by pivot pins 38 and 40 respectively.

The laterally extending arm of the bell crank 26 is pivotally connected to one end of a push-pull rod 42; the other end of which is pivotally connected to one arm of a second bell crank 44 which is pivotably mounted upon the control frame as by means of the pin 38. The other arm of the bell crank 44 is pivotally connected to the lower end of a pilot control rod 46 which extends from the control frame 30 rearwardly toward the airplane pilot's seat 50. The control rod 46 is provided with a pivot joint disposed substantially axially with respect to the pin 40, and its upper end is supported relative to the control frame by means of a tubular housing member 52 which is mounted at its lower end upon the frame 30. The upper end of the control rod 46 engages the tubular column member 52 in splined relation, as at 54, and is provided with an internally threaded chamber 56 at its upper end. A threaded bolt 58 extending into the chamber 56 and engaging the threads of the control rod 46, is rotatably supported against axial movement upon the column 52, as by means of a thrust bearing 60. The outer end of the bolt 58 extends beyond the housing 52, and is rigidly connected to a pilot control wheel 62.

The threads on the bolt 58 and on the rod 46 are of such design that rotation of the wheel 62 toward the right, as viewed from the pilot's seat, will cause the control rod 46 to move axially away from the wheel 62 and relative to the housing 52. Thus, the bell cranks 44 and 26 and the rod 42 are actuated to move the push-pull tube 24 toward the forward end of the fuselage, or to the left as viewed in Figs. 1, 2 and 4. Such motion of the tube 24 rotates the cross bar 22 about the pivot point 23 in a clockwise direction as viewed in Fig. 1, and through means of the rods 20 and the crank arms 18 actuates the torque tubes 16 in opposite directions of rotation in such manner that the left hand aileron 14 of the airplane is depressed and the right hand aileron is raised. Thus means have been provided for banking the airplane laterally in response to rotation of the control wheel 62 in such manner that rotation of the wheel toward the left causes the left wing tip to lower and the right wing tip to rise, and vice versa, thus disposing the airplane laterally in any desired angular relation to the horizon.

The figures illustrate an airplane of the tractor low wing monoplane type, provided with a stabilizer 68 and elevator flaps 69 hingedly connected to the trailing edge of the stabilizer. However, it is to be understood that the principles of the invention may be applied with equal facility to any other general type of airplane such as the high wing monoplane, bi-plane, etc., and to airplanes employing other kinds of engine and tail wing and elevator arrangements. As is well known in the aeronautical art, the side view surfaces of the completed airplane provide what will be termed a "keel effect" for the purposes of this specification and the appended claims, in response to air pressure forces disposed laterally thereagainst. By so proportioning and relatively arranging the keel effect producing elements of the airplane as to dispose their approximate center of keel effectiveness (C. K.) aft of the center of gravity (C. G.) of the loaded airplane, as indicated in Fig. 2, an arrangement is provided whereby spanwise motion of the airplane toward the side of the depressed wing during a banking maneuver produces an unbalanced force centered behind the C. G. of the airplane (at C. K.) which results in the generation of nose-down turning moment about the line of the center of gravity. Hence, the airplane automatically turns toward the direction of the depressed wing tip, and a directional turning movement is effected. Thus it is seen that provision has been made for directional control of the airplane solely through manipulation of the roll control means as hereinbefore described without employing the usual air rudder. Actual tests have proven this arrangement for directional control purposes to be superior to the rudder type of control arrangement for purposes wherein simplicity and safety of operation is the primary requisite, because the problem of proper coordination of banking and rudder controls is obviated; and an airplane which is properly designed in accordance with the above described principles will not go into side slips and spins. Hence, an airplane directional flight control system has been provided whereby directional control is effected simply by rotating the control wheel 62 toward the direction of the desired turn in a manner identical to automobile directional control practice.

The airplane is provided with a steerable landing gear; and as shown in the figures, the landing gear may comprise a pair of directionally fixed wheels 70 located aft of the center of gravity, and a steerable wheel 72 located forwardly of the center of gravity (Figs. 1, and 4). The steerable wheel 72 is swivelly mounted upon the fuselage 10 as by means of a post 74 which is forked at its lower end to receive the wheel and rotatably mounted at its upper end by bearings 76. The post 74 is preferably of two-piece construction and provided with shock-absorbing means, such as a coil spring 78, to provide shock-absorbing means between the wheel 72 and the fuselage. A crank arm 80 extends laterally from the post 74 to a point of pivotal connection with a push-pull tube 82, the opposite end of which is operably connected to the lower end of the bell crank 26 previously described. Thus, means have been provided for turning the wheel 72 in the direction of any desired ground turning maneuver in response to rotation of the pilot control wheel 62 in a similar direction of movement, and a complete airplane directional control system has been provided wherein a single control wheel, which to all appearances resembles the conventional automobile steering wheel, constitutes the sole directional control means for the airplane in connection with both flight and ground travelling maneuvers. Consequently the pilot has sensitive and positive directional control of the airplane under all conditions of motion in direct response to manipulations of the control wheel 62 of exactly the same order as he would employ in steering his automobile.

Wing lift characteristic changing means are operably connected to a lever or pedal 100 which is pivotably mounted as at 102 upon the base 29 of the control supporting unit in such manner as to extend upwardly therefrom to the left of the pilot control wheel column. Thus, the pilot-operable end of the pedal is disposed at a position coinciding substantially with the natural position of the left foot of the pilot in a manner similar to the arrangement of the clutch operating pedal of the standard type automobile. In the exemplification of the invention illustrated in the accompanying drawings, the lift characteristic changing means are in the form of pivotable flaps 104 which are hinged to portions of the trailing edges of the wing panels 12. The flaps 104 are adapted to be simultaneously moved about the axes of their hinged connections by means of torque tubes 106 which are in turn interconnected intermediately of the fuselage by means of universal joints 108 and an intermediate torque tube 110. A crank arm 112 extends rigidly from one of the torque tubes and is operably connected to the pedal 100 by means of a push-pull tube 114 in such manner that when the pedal 100 is depressed by the foot of the pilot the flaps 104 are depressed downwardly away from their neutral position, thus increasing the effective camber and the angle of the zero lift line and the maximum lifting ability of the wing.

The wing lift characteristic changing means are preferably of a type having two separate ranges of action; the first range being such as to provide a relatively low drag and high lift performance, and the second range being adapted to provide both a high lift and high drag performance. A flap and wing combination capable of providing these results has been previously described in detail and patented by me in United States Patent No. 2,030,631 and Reissue Patent No. 20,901. The construction disclosed therein comprises, generally, a wing of fixed or constant contour and a flap connected in continuation thereto, the flap being so constructed that when it is within a first range of action position, (as indicated by the letter "a" in Fig. 4), no substantial convex discontinuity of the upper surface of the combined wing and flap airfoil exists and the effective camber and lift characteristic has been increased without a proportionate increase in drag. When moved into its second range of action (as indicated by the letter "b" in Fig. 4), the flap defines such angular relation with respect to the wing that substantial discontinuity of both the upper and lower airfoil surface exists, with the result that turbulent air flow is produced and both lift and effective drag are greatly increased.

The wing 12 is mounted upon the fuselage in relatively low angle of attack relation, and the elements of the undercarriage are so proportioned and arranged as to support the airplane upon the ground in substantially its normal flight attitude, that is with its longitudinal flight thrust axis disposed substantially parallel to the horizon. In taking off, either one of two procedures may be employed. The elevator may be left in its neutral position and the ship taxied until flying speed is attained, at which time the flaps 104 are depressed by means of the application of pressure by the pilot upon the pedal 100. The pressure exerted by the pilot may be so regulated as to move the flaps 104 into their first range of high lift and low drag action, and thus the lift capacity of the wings is substantially increased without a proportionate increase in resistance to forward motion. In response to this maneuver the airplane will rise from the ground in an approximately horizontal attitude at the end of a relatively short and low speed take-off run and when sufficient flying altitude has been attained the flap operating pedal is released by the pilot and the flaps automatically resume their neutral trailing positions for cruising flight. During the flap depressing movement above described the pilot is enabled to accurately "feel" the aerodynamic response to the flap adjustment control movements, and toward the end of the rising maneuver, as the forward speed of the airplane becomes perceptibly less, the pilot also senses this deceleration in a manner similar to his experiences during changes in speed of the automobile between gear shifting operations. Thus, an airplane control system has been provided which includes a foot-operable pedal adjacent the left side of a steering wheel column for changing the lift characteristic of the main sustaining wing and the trimming speed of the airplane.

It is readily seen that the above described take-off control technique is quite similar to the control technique employed in connection with the starting-up of the standard automobile, wherein a control pedal positioned to the left of the steering column is successively depressed and released to procure the desired travel performance, and therefore constitutes the major speed control means of the vehicle. In fact, the airplane control system above described functions in a manner identical to that of the famous model T Ford automobile wherein the left foot pedal is adapted to be depressed for low gear starting or climbing action and released rearwardly for cruising travel. It is to be understood that the invention is not limited to the use of the preferred two-range type of flaps above described, but that any other suitable form of wing lift characteristic changing means, such as flaps of the general type of any of the several simple and special forms of landing flaps in present day use, may be employed in combination with the other control elements of the invention to enable the use of the take-off technique above described. For the reasons given, the two-range type of lift changing device is preferred, but one-range type of devices will very satisfactorily function in connection with the invention.

An alternative take-off procedure may be employed by utilizing the elevator 69 to depress the tail and pitch the airplane about the axis of the wheels 70 to a nose up attitude when flying speed is attained. This disposes the wing in a relatively high angle of attack position, from whence the take-off is accomplished much in the manner of that of the conventional type airplane. For this purpose the pivotable control frame 30 is operatively connected to the elevator 69 as by means of an arm 125 extending from the upright link 32 below the pivot point 34 to a point of pivotal connection with one end of a push-pull tube 127 (Figs. 4 and 5). The tube 127 is pivotally connected at its opposite end to a horn 129 extending laterally from the elevator. Hence, forward and rearward rocking movements of the control frame 30 in response to pressures applied through the hands of the pilot upon the control wheel 62 will procure corresponding downward and upward pivotal movements, respectively, of the elevator. A casing member 65 is mounted upon the pivotal frame 30 in such manner as to enclose its side and end portions and to move with the frame in sliding relation within a close fitting end opening in a stationary casing member 66 which is rigidly mounted upon the base 29 and adapted to accommodate the casing 65 in telescopic relation therein. The pedals 80 and 100 emerge through appropriate openings formed in the sides of the casing 66 which closely fit the adjacent portions of the pedals. Thus, an airtight construction is provided which prevents leakage of outside air into the pilot compartment between the relatively movable parts of the control mechanism.

In landing, the pilot again has his choice of employing either one of two procedures. The motor may be idled, and without changing the longitudinal attitude of the airplane, it will simply settle or fly onto the ground; or in the alternative, the airplane may be first nosed downwardly and then levelled off as it approaches ground contact, much in the manner of the landing of the conventional type airplane. Further reduction of speed then causes the craft to settle into ground contact; and in either case the undercarriage meets the ground and supports the airplane in an attitude similar to that of normal cruising flight, the wing being disposed at a low angle relative to the horizon. Consequently winds moving substantially parallel to the landing surface have no material effects upon the wing, as might otherwise tend to upset the airplane. In connection with either type of landing maneuver the flaps 104 may be depressed to their second range or high lift high drag position to increase the gliding angle and reduce the forward speed and the landing run.

Ground travel braking means are provided, and, as illustrated in Fig. 3, may be in the form of an equalized hydraulic braking system associated with the directionally fixed wheels 70. A pedal 80, pivotably mounted upon the control base 29 extends outwardly and upwardly therefrom to the right hand side of the control wheel column 52, in a manner similar to the conventional type of automobile brake pedal. The pedal lever 80 is operably associated with the piston of the hydraulic braking system in such manner that the wheel brakes are applied when the pedal is depressed against the action of a spring, and thus means have been provided for halting the ground travel of the airplane in a manner similar to that employed in stopping an automobile.

The pilot compartment of the airplane preferably includes a substantially horizontally disposed floor portion 120 which extends longitudinally of the airplane from the location of the pilot control frame 30 rearwardly to the location of the pilot's seat 50 which is arranged to support the pilot in an upright seated position preferably at an elevation above the level of the floor portion 120, and in such position that when the pilot is seated therein, his feet naturally assume an attitude wherein the heels rest upon the floor surface and the toes are adjacent the upper end portions of the pedals 80 and 100, all in a manner similar to the standard arrangement of corresponding automobile control elements. A forward floor portion 122 extends from the forward marginal edge of the floor portion 120 and upwardly therefrom in inclined relation to provide a suitable supporting surface for the feet of the pilot and copassenger when seated. The floor portions 120 and 122 are preferably fitted about the casings 65 and 66 in air-sealed relation below the points of egress of the pedal levers 80 and 100 through the casing 66. Hence, an airtight floor and movable control structure is provided to prevent entrance of outside air into the interior of the pilot compartment.

Engine speed control means are provided in the form of a spring releasable foot accelerator pedal 130 which is pivotably mounted adjacent its lower end upon some suitable portion of the floor structure and in such manner that the upper end of the pedal normally extends in spaced relation to the adjacent floor portion and is within convenient reach of the right foot of the pilot. A bell crank 132 is pivotably mounted, as by means of a shaft 134 in an airtight socket disposed intermedially of the floor structure for pivotable movement about an axis disposed transversely of the line of movement of the pedal 130. The relatively movable portions of the bell crank and the receiving socket are arranged in such manner that the clearance therebetween is at all times constant, and packing material of some suitable form may therefor be employed in the juncture to insure against leakage of air or gases into the pilot compartment. One end of the bell crank 132 is adapted to contact the under side of the pedal 130 in sliding relation, and the other end of the bell crank 132 is pivotally connected to a push-pull tube 136 which is operably associated with an engine throttle control shaft 139 through means of a crank arm 138. A spring 137 is operably connected to some moving portion of the accelerator control system in such manner as to normally urge the throttle toward an engine idling position.

A second engine speed control means of the fixable type is provided, and as shown herein may comprise a push-pull button 140 (Figs. 3 and 6) rigidly connected to one end of a push-pull wire 142, the other end of which is connected to a lever 144 adapted to bear against a laterally extending lug or stop portion 146 of the lever 138 in such manner that when the button 140 is pulled toward the pilot the lever 138 rotates the throttle actuating shaft 139 toward engine full speed position. The push-wire 142 may be supported in a casing 147 which is fixedly connected at one end to a portion of the instrument panel 150, and at its opposite end to a stationary portion 148 of the engine. The push-pull wire 142 and the casing 147 are so proportioned relative to one another that the wire will move relative to the casing upon the application of moderate pilot-imposed forces; but sufficient friction between the members exists to prevent movement of the wire 142 in response to forces from other sources.

Thus, pilot-operable engine speed control means have been provided including a pedal arranged adjacent the normal position of the right foot of the pilot and depressible against the action of a spring to move the engine throttle toward increasingly higher speed positions, and a fixable manually operable friction-controlled push-pull button mounted upon the instrument board of the airplane within reach of the hand of the pilot and movable rearwardly toward increasingly higher engine speed positions. The pedal controlled mechanism is operable independently of the fixable button-controlled mechanism, except that the fixable button-controlled means functions to establish a variable datum from which the pedal means may be adjusted and to which the pedal means returns upon release of the pedal 130. Thus engine speed control means for the airplane have been provided in such form and manner of functioning that they closely simulate in every respect the corresponding control arrangements for the standard type automobile motor. An engine carburetor flooding or choking device is preferably provided and arranged for pilot actuation by means of a push-pull button 160 extending from the instrument panel 150 at some location within reach of the pilot.

As illustrated in Fig. 6, the shaft 134 which mounts the bell crank 132 upon the floor structure is preferably arranged to extend axially into the plane of movement of the flap control pedal 100 and to be provided thereat with a laterally extending crank arm 160 which is pivotally connected to one end of a push rod 162. The push rod 162 is disposed within a suitable opening in the floor structure and extends therethrough to provide a flap control pedal stop means which is automatically adjusted to various positions in accordance with changes in the setting of the engine throttle. For instance, motion of the throttle control shaft 139 toward throttle open positions actuates the stop rod 162 toward the flap control pedal 100, and thus restricts the possible motion of the flap control pedal 100 by the pilot to various degrees in accordance with the throttle setting. Under throttle-off conditions the flap pedal 100 is unlimited by the rod 162 and may be depressed to a full flaps-down position. Consequently the pilot is free to depress the flaps to full down position under landing or other gliding engine-idling conditions, and under take-off or other engine high speed conditions is allowed to depress the flaps 104 only into their first range or high-lift low-drag position.

In the event that the spring 137 should break or become accidentally disconnected from the throttle control mechanism so as to fail to return the throttle to an engine idling position upon release of pressure by the pilot upon the pedal 130, the throttle control mechanism may be returned to the throttle-closed position by the application of pressure upon the pedal 100 through means of the push rod 162. The application of pressure upon the pedal 100 under such circumstances is in full accord with the instincts of the average person acquainted with automobile travel because it is natural under such conditions to depress both pedals to attempt to bring the vehicle to a stop to the end that the defect in the throttle control system may be remedied.

It may be found that an airplane designed in accordance with this invention may possess slight tendencies to yaw under different conditions of speed; and to provide means for correcting this yawing tendency or to directionally trim the airplane, it might be desired to provide a trim tab 170 at the trailing edge of the fuselage fin surface. The trim tab may be arranged to move about a substantially vertical pivotal axis by means of a push-pull rod mechanism terminating in a push-pull button 172 mounted upon the instrument panel 150 in such manner that the button 172 may be moved toward or away from the pilot to shift the trim tab in opposite directions into deflected positions relative to the surrounding airstream. An engine ignition switch 175 may also be located upon the instrument panel 150 as shown. An engine starter control button 177 may also be arranged to extend from the floor surface within convenient reach of the right foot of the pilot, or if preferred, may be mounted upon the panel 150.

By reason of the novel and simplified airplane control system herein provided, an airplane constructed in accord with the principles of the invention may be maneuvered in connection with both flight and taxiing operations in response to a pilot control technique that is substantially identical to that of the operator control technique employed in connection with present day automobiles. For instance, in connection with starting up, the engine accelerator pedal operable by the right foot of the pilot provides sensitive and quickly responsive control of the engine revolution speed during the take off run and initial climb. During this same period the wing lift characteristic changing control pedal is manipulated by the left foot of the pilot to obtain the desired engine-to-travel relationship. Upon attainment of flying altitude the left foot pedal is released to allow the lift control mechanism to return to cruising flight condition, and the fixable throttle control mechanism may be brought into play to relieve the pilot of the necessity of pressing against the accelerator pedal. At any time, however, if extra power is needed, further depression of the accelerator pedal will provide quick response to the requirements of the occasion. To land, the pilot returns the fixable throttle control mechanism to the engine-idling position and the airplane follows its natural gliding path while maintaining its substantially horizontal longitudinal attitude. During the landing glide the left foot pedal may be depressed to increase the angle of glide and to reduce the forward speed and the right foot pedal may be depressed to apply the ground wheel braking mechanism, to reduce the landing run.

Thus, to terminate a flight, the throttle accelerator mechanism is released to return to engine-idling position and both feet of the pilot are pressed against the respective pedals to each side of the control wheel column, in exactly the same manner as in halting the travel of an automobile. At all times during the take-off, cruising, landing and taxiing operations complete directional control is centered in the pilot control wheel, which need only be rotated about the axis of its column support to effect complete directional control in identically the same manner as in the manipulation of the automobile "steering wheel." Coincidentally the airplane is automatically laterally banked in the appropriate degree to maintain proper flight control. It is by reason of this arrangement that both feet of the pilot are relieved of participation in directional control movements and are free at all times to manipulate the major speed control elements; to wit; the flap pedal, the brake pedal, and the engine accelerator pedal, as in the case of the automobile. As stated hereinabove, the directional control wheel 62 and the control pedals 100, 80 and 130 are all within convenient reach of the hands and feet, respectively, of the pilot when he is seated in the seat 50; and the expression "within convenient reach" as used herein and in the claims is intended to mean operable by the pilot throughout the full range of control motions without requiring shifting or other changes in the disposition of the pilot's body. Consequently, any of said controls may be operated by the pilot without any tendency of the pilot to unconsciously apply actuating movements to the other of said controls; and thus it will be understood that emergency movements of one or more of the controls will not tend to produce sudden unintended applications of control movements to the other of said controls. Also, at all times during flight and taxiing operations the airplane remains at a substantially horizontal longitudinal attitude, similar to automobile travel, and the difficulty and confusion attendant to acquiring pitch control technique in connection with conventional methods of taking off and landing in previous types of airplanes is avoided. Consequently, an airplane embodying this invention is completely controlled by a simplified technique in response to either consciously or instinctively directed automobile type pilot control movements of control instruments which by reason of their nature and relative arrangement resemble those which are provided in the standard automobile. Hence, the control of an airplane incorporating this invention is materially simpler and safer than is the case in connection with previous types of airplane control mechanisms.

It will be understood that the features of the invention as described hereinabove in connection with land planes may be applied with equal facility to water borne aircraft; and that in the case of seaplanes, steerable water rudders will take the place of the steerable ground wheel 72 of Figs. 2 and 4, the mechanism connecting the steering means and the pilot wheel being substantially the same in either case.

For example Fig. 7 illustrates the airplane fuselage 10 having wings 12; ailerons 14; stabilizer 68; and elevator 69, mounted upon pontoons 200. Water rudders 202 are mounted at the trailing end portions of the pontoons 200; and the rudders 202 are each equipped with horns 204 leading into operative connection through push-pull rods 206 with a cross bar 208 which is centrally pivoted and attached to the control rod 24 hereinabove described in such manner that rotation of the control wheel 62 produces movements of the rudders consistent in direction with the flight directional turning movements produced by manipulation of the control wheel, as explained hereinabove.

Although only one form of the invention has been shown and described in detail, it will be apparent to those skilled in the art that the invention is not so limited but that various changes can be made therein without departing from the spirit of the invention or from the scope of the appended claims.

I claim:

1. In an airplane having a wing and a pilot seat, in combination, means for changing the angle of attack of the wing zero lift line, a pilot-operable control pedal disposed within convenient reach of a foot of the pilot when seated in said seat, means operably connecting said angle of attack changing means and said pedal, means for changing the direction of the airplane travel, a pilot-operable manual control member for said direction changing means disposed within convenient reach of a hand of said pilot when seated in said seat, means operably connecting said manual control member and said direction changing means, the respective positions of said pedal and said manual control member relative to said seat being such as to permit the pilot to apply control movements to either of said pilot-operable control devices without substantially changing the disposition of the pilot's body relative to the other of said control devices.

2. In an airplane having a wing and a pilot seat, in combination, means for changing the angle of attack of the wing zero lift line, a pilot operable control pedal disposed within convenient reach of a foot of the pilot when seated in said seat, means operably connecting said angle of attack changing means and said pedal, means for changing the direction of the airplane travel, a manually operable pilot wheel for controlling said direction changing means, said wheel being disposed within convenient reach of the hands of said pilot when seated in said seat, and means operably connecting said wheel and said direction changing means.

3. In an airplane having a wing and a pilot seat, in combination, means for changing the direction of the airplane travel, a manually operable pilot wheel for controlling said direction changing means, said wheel being disposed within convenient reach of the hands of said pilot when seated in said seat, and means operably connecting said pilot wheel and said direction changing means, means for changing the angle of attack of the wing zero lift line, a pilot operable control pedal disposed within convenient reach of a foot of the pilot when seated in said seat, means operably connecting said angle of attack changing means and said pedal, said pedal and said means connecting said angle of attack changing means and said pedal being so arranged that the application of pedal actuating forces by said pilot in a direction away from said pilot's body increases the angle of attack of the wing zero lift line.

4. In an airplane having a wing and a pilot seat, in combination, means for changing the angle of attack of the wing zero lift line, a pilot operable control pedal disposed within convenient reach of the left foot of the pilot when seated in said seat, means operably connecting said angle of attack changing means and said pedal, means for changing the direction of the airplane travel, a manually operable pilot wheel being disposed within convenient reach of the hands of said pilot when seated in said seat, and means operably connecting said pilot wheel and said direction changing means.

5. In an airplane having a wing and a pilot's seat and its center of gravity located ahead of its center of keel effect a sufficient distance to provide directional flight control solely by banking, in combination, banking producing means operably connected to a manually operable control wheel located within convenient reach of the hands of the pilot when seated in said seat, wing zero lift line angle of attack changing means, a pilot operable control pedal disposed within convenient reach of the left foot of the pilot when seated in said seat, and means operably connecting said control pedal and said angle of attack changing means.

6. In an airplane having a wing and a pilot seat and ground contacting wheels, in combination, flight and ground travel directional control means operably connected to a single manually actuated control member located within convenient reach of the hands of the pilot when seated in said seat, flap means for changing the angle of attack of the wing zero lift line, a pilot operable control pedal disposed within convenient reach of the left foot of the pilot when seated in said seat and operably connected to said flap means, a second pilot operable control pedal disposed within convenient reach of the right foot of said pilot when seated in said seat, ground wheel braking means operably associated with said ground wheels, and means operably connecting said second mentioned pedal and said braking means.

7. In an airplane having a wing and a pilot seat, in combination, means for changing the angle of attack of the wing zero lift line, a pilot operable control pedal disposed within convenient reach of the left foot of the pilot when seated in said seat, means operably connecting said angle of attack changing means and said pedal, means for changing the direction of the airplane travel, a manually operable control wheel for controlling said direction changing means, said control wheel being disposed within convenient reach of the hands of said pilot when seated in said seat, and means operably connecting said control wheel and said direction changing means, ground contacting wheels, braking means operably associated with said ground contacting wheels, a second pilot operable control pedal disposed within convenient reach of the right foot of the pilot when seated in said seat, and means operably connecting said braking means and said second mentioned foot pedal, said first and second mentioned connecting means, respectively, being so arranged as to produce increased angle of attack of the wing zero lift line and increased wheel braking effects, respectively, upon application of control movement producing forces thereon in directions away from the body of said pilot.

8. In an airplane having a wing and a pilot seat and water contacting means, in combination, flight and water travel directional control means operably connected to a single manually actuated control member located within convenient reach of a hand of said pilot when seated in said seat, flap means for changing the angle of attack of the wing zero lift line, a pilot operable control pedal operably connected to said flap means and disposed within convenient reach of the left foot of the pilot when seated in said seat.

9. In an airplane having a wing and a pilot seat, in combination, means for changing the angle of attack of the wing zero lift line, a pilot operable control pedal disposed within convenient reach of the left foot of the pilot when seated in said seat, means operably connecting said angle of attack changing means and said pedal, means for changing the direction of the airplane travel, a manually operable wheel for controlling said direction changing means, said wheel being disposed within convenient reach of the hands of said pilot when seated in said seat, and means operably connecting said pilot wheel and said direction changing means, and an engine throttle control pedal operable by said pilot and disposed within convenient reach of his right foot when he is seated in said seat.

10. In an airplane having a wing and a pilot seat, in combination, flap means for changing the angle of attack of the wing zero lift line, a pilot operable control pedal disposed within convenient reach of a foot of the pilot when seated in said seat, means operably connecting said flap means and said control pedal in such manner that application of pedal moving forces directed away from the body of said pilot actuate said flap means toward increased wing zero lift line angle of attack positions, means for changing the direction of the airplane travel, a manually operable control wheel for said direction changing means operably connected therewith and disposed within convenient reach of the hands of said pilot when seated in said seat.

11. In an airplane having a wing and a pilot's seat and its center of gravity located ahead of its center of keel effect a sufficient distance to provide directional flight control solely by banking, in combination, banking producing means operably connected to a manually operable control wheel located within convenient reach of the hands of the pilot when seated in said seat, wing zero lift line angle of attack changing means, a pilot operable control pedal disposed within convenient reach of the left foot of the pilot when seated in said seat, means operably connecting said control pedal and said angle of attack changing means, an engine throttle control pedal operable by said pilot and disposed within convenient reach of his right foot when he is seated in said seat, and a variable stop device associated with said angle of attack control pedal for restricting the allowable extent of movement thereof, said variable stop device being actuated toward increasingly restrictive positions in response to actuation of said engine throttle control pedal toward increasingly greater throttle open positions.

12. In an airplane having a wing and a pilot seat and its center of gravity located ahead of its center of keel effect for a distance sufficient to provide directional flight control solely by banking, in combination, banking producing means operably connected to a manually operable pilot control wheel located within convenient reach of the hands of the pilot when seated in said seat, ground travel directional control means operably connected to said control wheel, flap means for changing the angle of attack of the wing zero lift line operably connected to a pilot controlled pedal disposed within convenient reach of the left foot of the pilot when seated in said seat, ground travel braking means, a second pilot controlled pedal operably associated with said ground travel braking means and disposed within convenient reach of the right foot of the pilot when seated in said seat, and a third pedal operably associated with the airplane engine throttle and disposed also within convenient reach of the right foot of the pilot when seated in said seat.

13. In an airplane having a wing and a pilot seat and its center of gravity located ahead of its center of keel effect for a distance sufficient to provide directional flight control solely by banking, in combination, banking producing means operably connected to a manually operable pilot control wheel located within convenient reach of the hands of the pilot when seated in said seat, ground travel directional control means operably connected to said control wheel, flap means for changing the angle of attack of the wing zero lift line operably connected to a pilot controlled pedal disposed within convenient reach of the left foot of the pilot when seated in said seat, ground travel braking means, a second pilot controlled pedal operably associated with said ground travel braking means and disposed within convenient reach of the right foot of the pilot when seated in said seat, and a third pedal operably associated with the airplane engine throttle and disposed also within convenient reach of the right foot of the pilot when seated in said seat, and a variable stop device associated with said flap control pedal for restricting the allowable extent of movement thereof, said variable stop device being actuated toward increasingly restrictive positions in response to actuation of said engine throttle control pedal toward increasingly greater throttle open conditions.

14. In an airplane, a pilot operable pedal disposed adjacent the normal position of one foot of the pilot, an engine throttle control mechanism operably connected to said pedal and adapted to be actuated to increasingly greater throttle open conditions upon depression of said pedal, a second pilot operable pedal disposed adjacent the normal position of the other foot of the pilot, wing lift characteristic changing means operably connected to said second pedal and adapted to be adjusted to a high lift condition by depression of said second pedal, a variable stop device associated with said second pedal for restricting the allowable degree of depression thereof, and means connecting said variable stop device and said engine throttle control mechanism adapted to actuate said variable stop device toward increasingly restrictive positions in response to actuation of said engine throttle control mechanism toward increasingly greater throttle open conditions.

15. In an airplane, an engine throttle control means including a spring and a control member operably connected to said spring and movable by the pilot toward increasingly greater throttle open positions against the action of said spring, a second control member, a wing lift characteristic changing means operably connected to said second control member and adapted to be adjusted in response to pilot manipulation of said second control member, and means responsive to actuation of said wing lift characteristic changing means toward a high lift condition to positively actuate said engine throttle control means toward throttle closed condition.

JOSEPH M. GWINN, Jr.